United States Patent [19]

Haag et al.

[11] Patent Number: 4,696,541

[45] Date of Patent: Sep. 29, 1987

[54] OPTICAL CABLE HAVING A PLURALITY OF BASIC ELEMENTS ARRANGED IN A COMMON SHEATH

[75] Inventors: Helmut Haag, Waldniel; Klaus Nothofer, Düsseldorf, both of Fed. Rep. of Germany

[73] Assignee: AEG Kabel Aktiengesellschaft, Monchen-Gladbach, Fed. Rep. of Germany

[21] Appl. No.: 563,463

[22] Filed: Dec. 20, 1983

[30] Foreign Application Priority Data

Dec. 20, 1982 [DE] Fed. Rep. of Germany ....... 3247090

[51] Int. Cl.⁴ ................................................ G02B 6/44
[52] U.S. Cl. ................................. 350/96.23; 174/68 R
[58] Field of Search .................... 350/96.23; 174/68 R, 174/70 S, 70 A

[56] References Cited

FOREIGN PATENT DOCUMENTS

| | | | |
|---|---|---|---|
| 2854718 | 7/1980 | Fed. Rep. of Germany | 350/96.23 |
| 2294460 | 7/1976 | France | 350/96.23 |
| 1592192 | 7/1981 | United Kingdom | 350/96.23 |

OTHER PUBLICATIONS

"Design & Practical Consideration for Manufacturing a Non-metalic F.O.C. for Aerial Application" by Rahdman et al., Conference Cherry Hill, N.J., U.S.A. (18-20, Nov. 1980).

"Optical Fiber Trunk Cable Design" by Takashima, IEEE, Jun. 1981, International Conference on Communication.

Primary Examiner—William L. Sikes
Assistant Examiner—Akm E. Ullah
Attorney, Agent, or Firm—Spencer & Frank

[57] ABSTRACT

An optical cable composed of a common sheath and a plurality of elongate basic elements enclosed by the common sheath, each basic element being composed of a stable sheath and at least one optical fiber housed and loosely guided in the stable sheath, and the plurality of basic elements being assembled together to form a plurality of basic units each of which is composed of several basic elements and is deformable transverse to the length of the basic elements. The plurality of basic units is assembled together to form at least one cylindrical layer of the cable, with each basic unit in the circular layer having a noncircular cross-sectional configuration which is flattened in the radial direction of the cable, while the stable sheaths of the basic elements are not significantly deformed, as a result of a deformation pressure exerted radially inwardly on the circular layer.

32 Claims, 5 Drawing Figures

CROSSPLY
OF A
NOZZLE

OPTICAL CABLE HAVING A PLURALITY OF BASIC ELEMENTS ARRANGED IN A COMMON SHEATH

BACKGROUND OF THE INVENTION

The present invention relates to an optical cable, or optical fiber cable, of the type described in AEG-KABEL Mitteilungen [AEG Cable Reports], No. 1/82, pages 2–4. Such a cable is composed of a plurality of basic elements arranged in a common sheath, each basic element including a stable sheath and at least one optical fiber loosely guided in the stable sheath. A plurality of such basic elements is combined into a basic unit held together by mounting elements.

In known cables of this type, the basic units are composed of a plurality of basic elements which are twisted around a supporting element. Each basic element includes a stable sheath in which one or a plurality of light conductive fibers are loosely guided so that mechanical stresses on the optical cable can have no adverse effect on the characteristics of the light-conductive fibers. Each basic unit has a cross section which is of stable form. In an optical cable assembled of such basic units in the manner of a unit type cable, there exists a relatively large proportion of unused cavities. therefore the resulting cable diameter is relatively large for the number of fibers present. To fill the cavities with a filler material producing longitudinal water tightness. e.g. petrolatum, a relatively large quantity of material is required.

Multi-fiber optical cables in which individual basic elements are twisted in layers have a smaller diameter and a smaller total space that must be filled, but the costs of manufacturing them are much higher than for the cables of the first-mentioned type.

SUMMARY OF THE INVENTION

It is therefore an object of the present invention to provide an optical cable of the first-mentioned type in which, with a given number of optical fibers, the resulting total diameter is reduced and the requirement for fillers to achieve longitudinal water tightness is reduced, while simultaneously as much free space within the sheath is provided for the optical fibers.

The above and other objects are achieved, according to the present invention, by the provision of an optical cable comprising a common sheath and a plurality of elongate basic elements enclosed by the common sheath, each basic element comprising a stable sheath and at least one optical fiber housed and loosely guided in the stable sheath, and the plurality of basic elements being assembled together to form a plurality of basic units each of which is composed of several basic elements and is deformable transverse to the length of the basic elements, the plurality of basic units being assembled together to form at least one cylindrical layer of the cable, with each basic unit in said circular layer having a noncircular cross-sectional configuration which is flattened in the radial direction of the cable, while the stable sheaths of the basic elements are not significantly deformed, as a result of a deformation pressure exerted radially inwardly on the circular layer.

In contradistinction to the prior art arrangement, the cross section of the basic units is not rigid but modifiable. The individual basic elements of a basic unit can and need not be deformed, at least not significantly, so that the loose guidance of the optical fibers therein is not adversely affected. On the other hand, the basic elements in a basic unit can be displaced with respect to one another so that the basic elements can distribute themselves in an optimum manner in the respective cabled position in an optical cable so that significantly less unused cable space remains. The diameter of an optical cable containing a given number of basic elements becomes smaller and the requirement for fillers to obtain longitudinal water tightness is reduced. A particularly high packing density results if the sheaths of the basic elements are also permitted to be slightly deformed.

A particularly favorable design for the basic units results if less than eight basic elements are twisted in one layer to form a hollow basic unit structure. A twisted design of the basic units increases the flexibility of the optical cable, as does the smaller diameter. The hollow basic units, on the one hand, have the required stability for processing and handling and, on the other hand, can be given a different cross-sectional configuration by a relatively slight deformation pressure without thus requiring too much deformation of the sheaths of the individual basic elements.

A stress relief element can be placed between several basic elements of a unit. These stress relief elements must be loosely guided with much play. Their diameter should be selected to be less than 0.4 times the diameter of a basic element. It is of particular advantage if their diameter is approximately large enough, e.g. approximately 0.15 times the diameter of a basic element, so that one stress relief element fits into the cable space formed between three basic elements of a unit. With high demands for tensile strength, a plurality of thin elements can be used as the stress relief element.

In order for the basic elements to be able to be displaced relative to one another within a basic unit, the mounting elements which hold together the basic unit should not confine the unit to a particular form. Holding bands twisted around the basic unit in helical turns and/or elastic bands are of particular advantage.

Useful results have also been obtained with parallel and untwisted basic elements which are combined into a basic unit. In this case, however, each unit should be composed of five or six basic elements. In such a case, care must be taken that the holding elements are arranged loosely and expandably.

The present invention will now be explained in greater detail with reference to advantageous embodiments illustrated in the drawing.

DESCRIPTION OF THE PREFERRED EMBODIMENTS

Figure 1A:
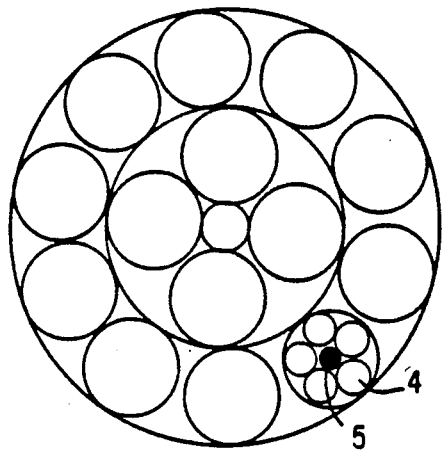
FIG. 1a is a cross-sectional view of a section of a layer of twisted basic units in an optical cable according to the prior art.
Figure 1B:
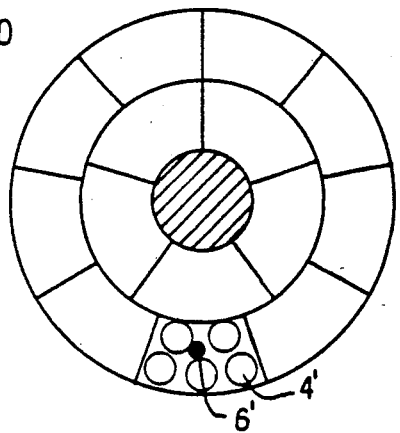
FIGS. 1b and 1c are views similar to that of FIG. 1a of two embodiments of the invention.
Figure 1C:
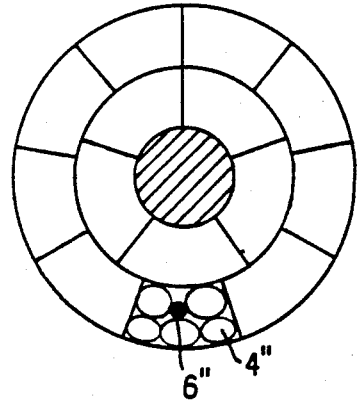

FIG. 1a shows a conventional optical cable of twisted units while FIGS. 1b and 1c are constructed according to the present invention.

In FIG. 1a a unit is formed of five basic elements 4 arranged in a circular pattern about a central element 5 and enclosed in a relatively rigid sheath. Several of these units are enclosed by a common sheath.

In FIG. 1b, five basic elements 4' are arranged in a somewhat flattened circular pattern about a central tension element 6' with the sheath of each element 4' being undeformed. In contract, in FIG. 1c, a certain amount of deformation which is not yet damaging is permitted for the sheath of each element 4". This results in a further reduction of the thickness of the twisted layers.

In the prior art structure of FIG. 1a, the basic elements 4 are arranged in a fixed circular configuration and due to their close contact with central element 5, which may be composed of strands to increase tensile strength, can practically not be deformed out of this position.

Basic elements 4' and 4" of FIGS. 1b and 1c, respectively, of each basic unit indicated in FIGS. 1b and 1c, respectively, are able to change their relative positions with respect to their original circular ring arrangement because due to the internal cavities within the common sheath, it is possible for the basic elements to escape circumferentially in the cable. Tension elements 6' and 6" are guided with much play in the originally existing cavity between the basic elements of a bundle and have such a small diameter that they fit into the interstice formed between three basic elements in the twisted layer of the optical cable.

Figure 2:
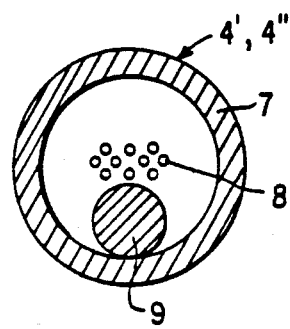
FIG. 2 is a simplified cross-sectional view of a basic element, to a larger scale than FIGS. 1.

FIG. 2 shows one basic element 4' or 4" containing a number of light-conductive fibers 8 spaced inwardly from stable but flexible sheath 7, and encircled by a helically wound supporting and cushioning thread 9.

Figure 3:
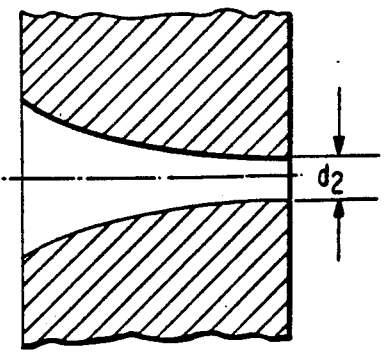
FIG. 3 is a simplifed cross-sectional view of a nozzle used to reduce the cable diameter.

An optical cable of the type here contemplated is composed of a plurality of layers each having the form shown in FIGS. 1. When manufacturing an optical cable structured according to the present invention, the basic units of each layer are twisted around a cylindrical body. In the case of the first, or innermost, layer, the cylindrical body is a supporting body. In the case of subsequent layers, the supporting body is the immediately underlying layer. Each layer is brought, during or after the twisting process, through a nozzle, or die as in FIG. 3, which reduces the outer diameter of the twisted layer. Due to the radially inwardly acting deformation pressure, the individual basic elements of the layer are distributed in such a manner that only a minimum of unused cavities remains in the cable.

The sheath 7 of the basic element 4' in not necessarily flexible, but can be of the same material as the sheath of basic element 4, such as e.g. polyester or polypropylene. Useful dimensions are 3 mm for the diameter and 0.3 mm for the wall-thickness.

The sheath 7 of the basic element 4" must have a radial flexibility, that so the circular cross-section of the basic element must be able to be changed to an elliptical cross-section by radial pressure to the unit. This can be achieved by using rubber-like plastic materials for the sheath 7 of the basic elements 4". For tensile reinforcement of the basic element, it can be covered for example with self-adhesive glass-filament-tape.

The holding tape to be used to keep each basic-unit together must be flexible to accomodate the variable circumference of the basic unit. The permissible extensibility factor should be around 1.1.

The holding tape can be made of strech-type textile fibres. The width should be 1 to 5 mm and the maximum thickness about 0.5 mm. The pitch can be chosen between one to four times the nominal diameter of the basic unit.

Regarding method claims 15 and 16 the utilized nozzle can be a stainless-steel-nozzle having a slightly tapered inner diameter.

The cable with the layer to be compressed is usually conveyed through the nozzle by pulling the cable. The amount of the radial compression should by limited by choosing the appropriate diameter $d_2$ of the nozzle to prevent damage to the basic elements or the holding tape. It can be useful to lubricate the basic units to reduce friction between the basic units and the nozzle.

It will be understood that the above description of the present invention is susceptible to various modifications, changes and adaptations, and the same are intended to be comprehended within the meaning and range of equivalents of the appended claims.

The embodiments of the invention in which an exclusive property or privilege is claimed are defined as follows:

1. An optical cable having a radial direction comprising a common sheath and a plurality of elongate basic elements enclosed by said common sheath, each said basic element comprising a stable sheath and at least one optical fiber housed and loosely guided in said stable sheath, and said plurality of basic elements being assembled together to form a plurality of basic units each of which is composed of several of said basic elements and is deformable transverse to the length of said basic elements, said plurality of basic units being assembled together to form at least one cylindrical layer of said cable, with each said basic unit in said cylindrical layer having a noncircular cross-sectional configuration which is flattened in the radial direction of said cable, while said stable sheaths of said basic elements are not significantly deformed, as a result of a deformation pressure exerted radially inwardly on said circular layer.

2. An optical cable as defined in claim 1 further comprising: mounting elements securing said basic elements together in each said basic unit, each said mounting element being constituted by a band wound around a respective unit with a winding pitch equal to at least twice the average diameter of said basic unit.

3. An optical cable as defined in claim 2 wherein each said band is of a soft, elastic material.

4. An optical cable as defined in claim 2 wherein said basic elements of each said unit are arranged in said unit in an untwisted state and parallel to each other.

5. An optical cable as defined in claim 4 wherein each said unit contains 5 of said basic elements.

6. An optical cable as defined in claim 1 further comprising a plurality of bands of soft, elastic material each wound about a respective basic unit for securing said basic elements together in said basic unit.

7. An optical cable as defined in claim 1 wherein said unit contains 5 of said basic elements.

8. An optical cable as defined in claim 1 wherein said basic elements of each said basic unit are arranged in a single tubular layer.

9. An optical cable as defined in claim 8 wherein said basic elements of each said basic unit are twisted together.

10. An optical cable as defined in claim 9 wherein each said basic element comprises at least one elongate stress relief element disposed with play within the region enclosed by said tubular layer.

11. An optical cable as defined in claim 8 wherein each said basic element comprises at least one elongate stress relief element disposed with play within the region enclosed by said tubular layer.

12. An optical cable as defined in claim 1 wherein each said unit further comprises an elongate stress relief element extending along the length of said unit and having a diameter of less than 0.4 times the diameter of each said basic element in said basic unit.

13. An optical cable as defined in claim 1 wherein said cable comprises a plurality of cylindrical layers of basic units, said layers being concentric to one another.

14. An optical cable as defined in claim 1 wherein said at least one cylindrical layer is circular.

15. Method for manufacturing an optical cable which has a radial direction and which includes a common sheath and a plurality of elongate basic elements enclosed by said common sheath, each said basic element including a stable sheath and at least one optical fiber housed and loosely guided in said stable sheath, and said plurality of basic elements being assembled together to form a plurality of basic units each of which is composed of several of said basic elements and is deformable transverse to the length of said basic elements, said plurality of basic units being assembled together to form at least one cylindrical layer of said cable, with each said basic unit in said cylindrical layer having a noncircular cross-sectional configuration which is flattened in the radial direction of said cable, while said stable sheaths of said basic elements are not significantly deformed, as a result of a deformation pressure exerted radially inwardly on said circular layer, said method comprising: twisting said basic units together to form one said cylindrical layer; and, simultaneously with said twisting step, forcing said layer through a nozzle dimensioned for exerting such deformation pressure on said layer to reduce the diameter of said layer.

16. Method as defined in claim 15 comprising performing said twisting and forcing steps on a succession of such layers having progressively increasing diameters, by twisting each successive layer about a layer having a smaller diameter after the smaller diameter layer has been subjected to said forcing step.

17. An optical cable as defined in claim 1 wherein said unit contains 6 of said basic elements.

18. An optical cable as defined in claim 4 wherein each said unit contains 6 of said basic elements.

19. An optical cable as defined in claim 12, wherein the diameter of the stress relief element is small enough to permit the stress relief element to fit with the cable space formed between three basic elements of a unit.

20. An optical cable, comprising:
a cylindrical support;
a plurality of elongated basic elements, each basic element including a plurality of optical fibers and a sheath around the fibers;
a plurality of elongated tension elements, the elongated tension elements having cross-sectional dimensions that are less than 0.4 times the cross-sectional dimensions of the basic elements; and
holding means for bundling the basic elements and tension elements in a plurality of basic units that are disposed about the support in a cylindrical layer, each basic unit including a tension element and a plurality of basic elements, the cylindrical layer being compressed so that the basic elements of each basic unit are disposed in a noncircular arrangement.

21. An optical cable as defined in claim 20, wherein said holding means comprises a plurality of bands, each band being wound around the tension element and basic elements of the respective basic unit.

22. An optical cable as defined in claim 20, wherein the basic elements of each basic unit are in an untwisted state and parallel to each other.

23. An optical cable as defined in claim 20, wherein there are at least five basic elements in each basic unit.

24. An optical cable as defined in claim 23, wherein there are less than seven basic elements in each basic unit.

25. An optical cable as defined in claim 20, wherein the basic elements of each basic unit are twisted together.

26. An optical cable as defined in claim 20, wherein said basic elements have cross-sections that are substantially circular.

27. An optical cable as defined in claim 20, wherein said basic elements have cross-sections that are substantially elliptical.

28. An optical cable as defined in claim 20, wherein the elongated tension elements have cross-sectional dimensions that are less than about 0.15 times the cross-sectional dimensions of the basic elements.

29. An optical cable as defined in claim 20, further comprising:
a plurality of additional elongated basic elements, each additional basic element including a plurality of additional optical fibers and an additional sheath around the additional optical fibers;
a plurality of additional elongated tension elements, the additional elongated tension elements having cross-sectional dimensions that are less than 0.4 times the cross-sectional dimensions of the basic elements; and
additional holding means for bundling the additional basic elements and additional tension elements in a plurality of additional basic units that are disposed about the cylindrical layer in an additional cylindrical layer, each additional basic unit including an additional tension element and a plurality of additional basic elements, the additional cylindrical layer being compressed so that the additional basic elements of each additional basic unit are disposed in a noncircular arrangement.

30. An optical cable as defined in claim 29, wherein the basic elements, additional basic elements, tension elements, and additional tension elements have cross-sections that are substantially circular, the diameters of the tension elements and additional tension elements being less than 0.4 times the diameters of the basic elements and additional basic elements.

31. An optical cable as defined in claim 30, wherein each basic unit includes at least five basic elements and each additional basic unit includes at least five additional basic elements.

32. An optical cable as defined in claim 30, wherein the diameters of the tension elements and additional tension elements are not greater than about 0.15 times the diameters of the basic elements and additional basic elements.

* * * * *